March 10, 1964 S. RUBEN 3,124,728
SEALED ELECTROLYTIC CAPACITOR
Filed Oct. 19, 1960

INVENTOR.
SAMUEL RUBEN
BY
ATTORNEY

United States Patent Office 3,124,728
Patented Mar. 10, 1964

3,124,728
SEALED ELECTROLYTIC CAPACITOR
Samuel Ruben, 52 Seacord Road, New Rochelle, N.Y.
Filed Oct. 19, 1960, Ser. No. 63,524
6 Claims. (Cl. 317—230)

This invention relates to sealed electrical units, such as electrolytic capacitors, and, more particularly, to electrolytic capacitors of the so-called solid electrolyte type.

In conventional electrolytic capacitors of the described character, the anode generally comprised a porous body of film-forming metal, such as a porous pellet of pressed and sintered tantalum powder having a polarized dielectric film formed on the surface thereof. The solid electrolyte was composed of manganese dioxide disposed within and substantially filling the pores of said tantalum pellet in contact with said dielectric film and also forming a continuous layer on the exterior surface of the pellet. Preferably, this solid electrolyte of manganese dioxide resulted from thermal conversion of a manganous salt, such as manganous nitrate, in situ. An outer layer of carbon particles was applied to the manganese dioxide layer on the outer surface of the pellet and finally a cathode contact layer of suitable metal, such as copper, zinc, tin, silver or gold was sprayed onto said carbon layer.

Electrolytic capacitors of the solid electrolyte type have acquired substantial commercial importance in recent years due to their valuable characteristics, some of which are the relatively high capacitance values obtainable in a small space and the possibility of operating them within a very wide temperature range. However, full utilization of these advantageous characteristics was seriously handicapped by the existence of two major problems, which were: sealing the capacitors against atmospheric moisture and maintaining low contact resistance to the solid electrolyte of manganese dioxide. It has been found that the usual encapsulation in an insulative plastic material could not provide a permanently moisture proof seal and that the customary cathode contact layers of sprayed metal did not assure a constant low contact resistance connection to the solid electrolyte. These factors made it extremely difficult to manufacture solid electrolyte capacitors having consistently satisfactory and reproducible characteristics for long periods of time, including high stability and a low power factor.

I have discovered that the above-mentioned problems are capable of a simple and completely satisfactory practical solution.

It is an object of the present invention to improve sealed electrical units, specifically electrolytic capacitors of the solid electrolyte type.

It is another object of the invention to provide a novel and improved electrolytic capacitor of the solid electrolyte type which is positively and permanently sealed against atmospheric moisture and in which an electrical connection of low contact resistance to the solid electrolyte is positively assured.

It is a further object of the present invention to provide a novel and improved method of manufacturing electrolytic capacitors, such as capacitors comprising a porous, pressed and sintered tantalum powder pellet and a solid electrolyte of manganese dioxide, at a low cost.

Other and further objects and advantages of the present invention will become apparent from the following description, taken in conjunction with the accompanying drawing, in which.

Figure 1:
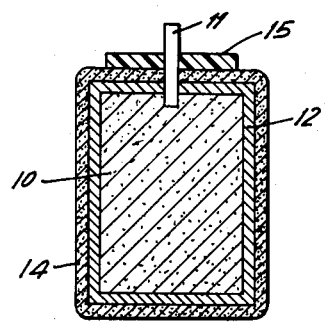
FIG. 1 is a vertical sectional view of an uncased electrolytic capacitor unit as it appears prior to its encapsulation and before applying the cathode terminal or contact thereto.

In all figures, the thicknesses of the various layers have been greatly exaggerated for clarity of illustration.

Broadly stated, in accordance with the principles of my invention, I provide an anode in the form of a porous body or pellet of pressed and sintered tantalum powder having a multiplicity of interconnected voids which is anodized or formed to a desired voltage, such as 35 volts, in a suitable forming solution, for example in an aqueous solution of phosphoric acid or nitric acid. This will cause the formation of a polarized dielectric film on the entire surface of the pellet including the surfaces of the interconnected voids. The anodized porous tantalum pellet is then vacuum-impregnated with a 50% aqueous solution of manganous nitrate and is heated to a temperature between 250° and 450° C., preferably to about 260° C., in order to decompose the manganous nitrate by pyrolysis to manganese dioxide which precipitates in the pores or voids and also on the outer surface of the tantalum pellet in contact with the polarized dielectric film thereon. These impregnation and heating steps are repeated several times until a manganese dioxide layer of the desired thickness is obtained. The outer manganese dioxide surface is then coated with a colloidal dispersion of pure electric-furnace graphite in water sold under the name Aquadag. When the power factor is not an important consideration, application of this graphite coating to the manganese dioxide layer may be dispensed with. The tantalum pellet is desirably further anodized between applying the several manganese dioxide coatings.

The graphitized tantalum-manganese dioxide unit is placed in a mold of a heat-resistant insulating material, such as a tetra-fluoroethylene resin sold under the name Teflon, with a thin disc of Teflon being forced over the tantalum lead protruding from the pellet. A suitable fused low melting point alloy is poured into the mold all around the unit, the mold being so constructed and arranged as to prevent the molten metal from contacting the tantalum lead. The melting point of the alloy is not particularly critical provided that it is below the maximum temperature the capacitor units can withstand without adverse effects. Various alloys of cadmium, tin and bismuth, or of other low melting point metals, may be used. Specifically, I have found that an alloy of 65% lead and 35% tin, by weight, having a melting point of about 220° C. is excellently suited for the purpose. After allowing the molten metal to cool and to solidify, the metal-jacketed capacitor unit is removed from the mold.

It will be noted that, upon solidifying, the low melting point metal will shrink and will apply appreciable pressure onto the underlying continuous outer manganese dioxide layer. This will assure permanent electrical connection of low resistance to the solid electrolyte. Also, the solidified layer or jacket of low melting point metal will provide hermetically sealed encapsulation for the capacitor unit, such seal being assisted by pressure of portions of the metal jacket upon the underlying thin Teflon disc or washer and being completed by applying a bead of a suitable casting resin, such as an epoxy resin, to the space between the tantalum lead and the corresponding annular region of the metal jacket. The anode terminal may be constituted by a so-called Dumet wire, which is a copper-clad wire of Invar, an alloy containing 63.8% iron, 36% nickel and 0.2% carbon, having a very low coefficient of expansion. The Dumet terminal wire is preferably spot-welded to the tantalum lead to provide a flexible terminal wire and to avoid strains on the sealed tantalum lead. If desired, a cathode terminal may be provided by placing one end of a tinned copper wire into the cast section while the said section is still in the molten state and allowing the molten metal to solidify around the said end of the terminal.

Referring now more particularly to FIG. 1 of the drawing, numeral 10 denotes the anode of an electrolytic capacitor in the form of a porous body or pellet of pressed and sintered tantalum powder characterized by the presence of a multiplicity of minute intercommunicating pores or voids. A lead wire 11 of tantalum is secured to the anode 10 such as by welding or by embedding one of its ends in the tantalum pellet during the pressing and sintering operations. A thin polarized dielectric film (not shown) is provided on the surface of the intercommunicating pores by a suitable forming treatment. The solid electrolyte is composed of manganese dioxide pyrolytically produced in the pores of said pellet in contact with said dielectric film and also forming a continuous layer 12 on the outer surface of the pellet. Outer layer 12 of manganese dioxide is coated with a colloidal graphite layer 14. This may be accomplished by dipping the pellet into a colloidal graphite suspension (Aquadag) and drying it to drive off the moisture. An apertured disc 15 about 0.005″ thick of Teflon, or similar heat-resistant insulating material, is forced over tantalum lead 11, the object of which will appear as the description proceeds. The tantalum capacitor unit is now ready for the encapsulation treatment in accordance with the invention.

Figure 2:
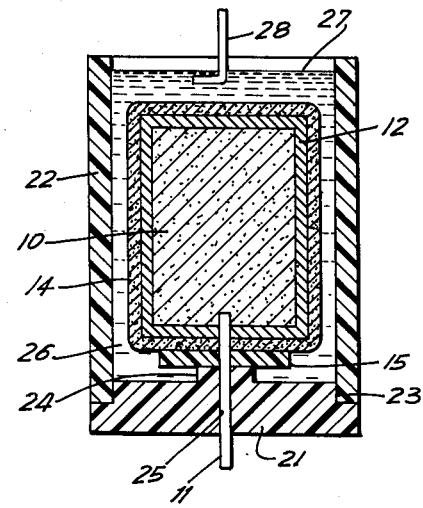
FIG. 2 is a similar view of the capacitor unit shown in FIG. 1 in conjunction with apparatus for carrying the method of the invention into practice.

To carry out this treatment, the unit is introduced in inverted position into a two-piece Teflon mold comprising a base 21 and a cylindrical sleeve 22 (FIG. 2). Base 21 is provided with an annular portion 23 of reduced diameter on which the bottom edge of sleeve 22 is seated in tightly fitting relation. The center region of base 21 is formed with a raised portion or boss 24 on which insulating disc 15 of the capacitor unit rests with anode lead wire 11 extending through a closely fitting central aperture 25 provided in the base for this purpose.

The low melting point metal is now brought to its melting point, which in the case of the preferred lead tin alloy composed of 65% by weight of lead and 35% by weight of tin is about 220° C, and is poured into the sleeve portion 22 of the mold, to fill out the interspace 26 between the capacitor unit and the inner surface of the mold up to a level 27 so that the entire capacitor unit is submerged in the molten metal. It will be noted, however, that due to the presence of boss 24 in base 21 of the mold, the molten metal will be kept away from contact with the central anode lead 11. The assembly is now allowed to cool until the body of molten metal completely solidifies whereupon the metal encapsulated capacitor unit is removed from the mold. If desired, a cathode terminal lead 28 of tinned copper may be permanently attached to the metal body by extending its hooked end into the molten metal and holding it there until the said metal is solidified.

Figure 4:
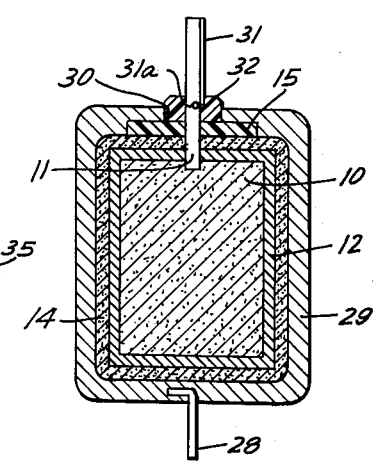
FIG. 4 is a vertical sectional view of a completed capacitor embodying the invention.

The completed and encapsulated capacitor is shown in FIG. 4. It includes the basic capacitor unit already described in connection with FIG. 2, parts of which are denoted by identical reference numerals. This unit is substantially completely encapsulated by or embedded in a seamless metal jacket 29 resulting from consolidation of the molten metal, with the exception of a small annular gap 30 between tantalum anode lead 11 and the corresponding edge of the metal jacket. Preferably, a flexible lead 31 of Dumet (copper-clad Invar) is welded to the upper end of tantalum anode lead at a point 31a within gap 30, and the said gap is filled with bead 32 of a suitable casting resin, such as an epoxy resin, thereby completing hermetic seal of the capacitor.

It is to be observed that, during its solidification, cast metal jacket 29 will shrink appreciably and will apply considerable pressure in all directions on the surface of the underlying outer manganese dioxide layer. This will assure a permanent electrical connection of very low and constant resistance to the solid electrolyte. It is further to be noted that the integrally cast seamless metal jacket will apply compression upon the underlying Teflon disc or washer 15, causing it to act as a gasket. The said jacket, together with the small epoxy resin bead, constitutes a hermetically sealed enclosure and positively prevents the entrance of atmospheric moisture into the capacitor unit. Thus, the principles of the invention provide a solution for the two most important practical problems which were heretofore encountered in the manufacture of electrolytic capacitors of the solid electrolyte type.

Figure 3:
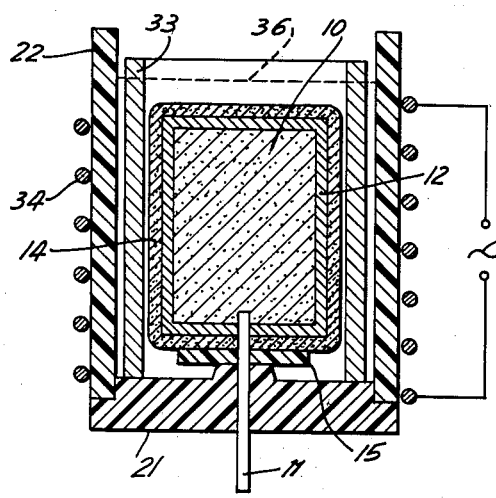
FIG. 3 is a view similar to FIG. 2, illustrative of apparatus for carrying out a modified embodiment of the method of the invention.

FIG. 3 illustrates an apparatus for carrying out a modified method of the invention. Essentially, the two-piece mold and the uncased capacitor unit are the same as those shown in FIG. 2 and their parts are designated by reference numerals. The difference resides in the fact that the encapsulating metal is not poured into the assembly in the molten state but is introduced in the form of a solid cylindrical sleeve 33 of low melting point metal into the interspace between the mold and the capacitor unit. Heating of the assembly to the melting point of the said metal sleeve is accomplished by windings of wire 34 around sleeve portion 22 of the mold and connected to a source 35 of high frequency energy of appropriate output for a short period, such as a few seconds. The molten metal of sleeve 33 will accumulate in the interspace of the mold, the original dimensions of the said sleeve being so determined that the quantity of metal present therein, upon being melted by the effect of high frequency current, is sufficient to fill out the said interspace up to a level 36 well above the capacitor unit. The assembly is allowed to cool until the molten metal is completely solidified whereupon the encapsulated unit is withdrawn from the mold. The desired completely sealed enclosure is finally accomplished by application of an epoxy resin bead 32 resulting in the finished and hermetically sealed unit already described in connection with FIG. 4 of the drawing.

The advantage of this modified form of the method of the invention is that it is readily adaptable to mechanization for the quantity production of hermetically sealed capacitors. This may be accomplished, for example, by providing a large number of molds on a revolving table or other transport mechanism, the said molds being sequentially loaded with uncased capacitor units and sleeves of low melting point metal, subjected to high frequency heating to melt said metal, cooled, the encapsulated units removed from the molds, etc., as those skilled in the art will readily understand.

Although the present invention has been described in connection with preferred embodiments thereof, variations and modifications may be resorted to by those skilled in the art without departing from the principles of the invention. Thus, instead of porous tantalum pellet, a solid body, strip or rod of tantalum may be used or porous or solid anodes of some other film-forming metal. Likewise, solid electrolytes other than manganese dioxide may be used with equal or similar results. I consider all of these variations and modifications to be within the true spirit and scope of my invention, as disclosed in the foregoing description and defined by the appended claims.

What is claimed is:

1. An electrical capacitor comprising an anode of film-forming metal having a polarized dielectric film thereon, a solid electrolyte layer in contact with said film, an encapsulation of low melting point metal cast around said electrolyte layer and substantially completely surrounding the said layer with the exception of a small opening therein, cast metal encapsulation having such accentuated thickness that upon solidification and shrinking it will maintain the underlying electrolyte layer under strong compression thereby providing low resistance electrical connection with said electrolyte layer, an anode terminal lead for the capacitor spacedly extending through said opening in the encapsulation, and an apertured insulative disc around said lead compressed between the end of the anode from which the said lead extends and the corresponding end of the cast metal encapsulation, said disc constituting a sealing gasket for the encapsulation and defining with said encapsulation a hermetically sealed enclosure for the capacitor.

2. An electrolytic capacitor comprising a porous anode pellet of film-forming metal characterized by intercommunicating voids and having a polarized dielectric film formed thereon, a solid electrolyte in contact with said film throughout said voids and including the exterior surface of said pellet, a contact layer on said surface of the pellet, a shell of low melting point metal cast around said pellet and with the exception of a small opening substantially completely encapsulating the same, said cast shell having such accentuated thickness that upon solidification and shrinking it will apply strong compression on the underlying contact layer thereby maintaining low resistance electrical connection with said contact layer and constituting a cathode terminal for the capacitor, an anode terminal lead connected to said pellet and extending through said opening in the shell, and an apertured insulative disc around said lead compressed between the end of the pellet from which the said lead extends and the corresponding end of the cast metal shell, said disc constituting a sealing gasket for the cast shell and defining therewith a hermetically sealed enclosure for the capacitor.

3. An electrolytic capacitor comprising a porous tantalum anode having a multiplicity of intercommunicating voids with a polarized dielectric film formed on the entire surface thereof, a solid electrolyte of manganese dioxide in contact with said film throughout said voids and forming a continuous layer on the exterior surface of said pellet, a contact layer on said exterior surface, a shell of low melting point metal cast around said pellet and with the exception of a small opening substantially completely encapsulating the same, said cast shell having such accentuated thickness that upon solidification and shrinking it will maintain the underlying contact layer under strong compression thereby constituting a cathode terminal for the capacitor, an anode terminal lead connected to said tantalum pellet and extending through said opening in said shell, and an apertured insulative disc around said lead compressed between the end of the anode pellet from which the anode lead extends and the corresponding end of the cast metal shell, said disc constituting a sealing gasket for the capacitor.

4. The electrolytic capacitor according to claim 3 in which the small annular gap between the anode terminal lead and the corresponding edge of the cast metal shell is filled with a bead of a suitable insulative sealing compound.

5. The method of making a sealed electrolytic capacitor which comprises providing an uncased capacitor unit including a porous anode pellet of film-forming metal characterized by intercommunicating voids and having a polarized dielectric film formed thereon, a solid electrolyte layer in contact with said film throughout said voids and on the exterior surface of said pellet, a cathode contact layer on said surface of the pellet, and an anode lead connected to said pellet; placing a washer of heat-resistant insulation on said lead directly above the corresponding region of said contact layer; placing said unit into a mold in spaced relation from the walls thereof and with said lead extending therefrom; pouring molten low melting point metal into said mold to submerge said unit in molten metal and to contact it with such metal with the exception of said lead; allowing said molten metal to solidify and to shrink around said unit to constitute a cathode terminal and a hermetically sealed encapsulating shell therefor which maintains said unit and said insulating washer under compression; and then removing the hermetically sealed and encapsulated unit from said mold.

6. The method according to claim 5 in which a bead of insulative sealing compound is applied to the small annular gap between the anode lead and the corresponding edge of the metal encapsulating shell.

References Cited in the file of this patent

UNITED STATES PATENTS

| | | |
|---|---|---|
| 2,299,228 | Gray | Oct. 20, 1942 |
| 2,299,667 | Waterman | Oct. 20, 1942 |
| 2,862,155 | Bubriski | Nov. 25, 1958 |
| 2,936,514 | Millard | May 17, 1960 |
| 2,970,182 | Miquelis | Jan. 31, 1961 |
| 3,036,249 | Hall | May 22, 1962 |

FOREIGN PATENTS

| | | |
|---|---|---|
| 160,620 | Australia | Jan. 17, 1955 |